United States Patent [11] 3,592,995

| [72] | Inventor | John F. Hinrichs |
| | | Menomonee Falls, Wis. |
| [21] | Appl. No. | 776,405 |
| [22] | Filed | Nov. 18, 1968 |
| [45] | Patented | July 13, 1971 |
| [73] | Assignee | A. O. Smith Corporation |
| | | Milwaukee, Wis. |

[54] AUTOMATED ELECTRON BEAM WELDING
5 Claims, 3 Drawing Figs.
[52] U.S. Cl. .................................................. 219/121
[51] Int. Cl. ................................................ B23k 15/00
[50] Field of Search .......................................... 219/121,
121 EB; 250/49.5, 41.9; 13/31

[56] References Cited
UNITED STATES PATENTS
3,073,951   1/1963   Burdg ............................ 250/41.9
3,222,496  12/1965   Windebank ................... 219/121
3,392,262   7/1968   Hansen ............................ 219/121

*Primary Examiner* — J. V. Truhe
*Assistant Examiner* — R. E. O'Neill
*Attorney* — Andrus, Sceales, Starke and Sawall ABSTRACT: This disclosure relates to an electron beam welding apparatus having a cylindrical outer housing. A plurality of equally circumferentially spaced chambers are secured to a central rotating support and project outwardly into sealing engagement with the outer housing. Operating stations are located about the assembly and include a loading station, a pair of vacuum pumping stations, a welding station and an unloading station. The welding station includes an opening through which an electron beam gun is secured to the outer portion of the housing in alignment with the opening. The gun is mounted to rotate to establish a circular weld.

PATENTED JUL 13 1971
3,592,995
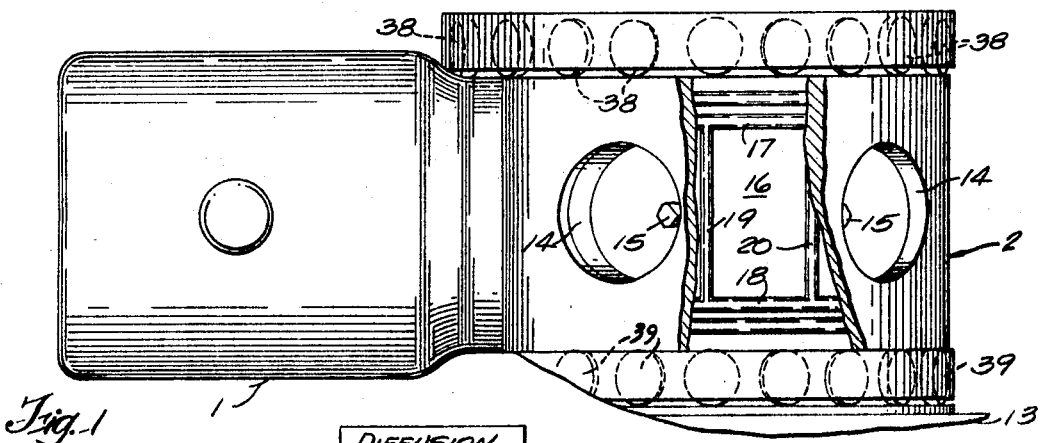
Fig. 1
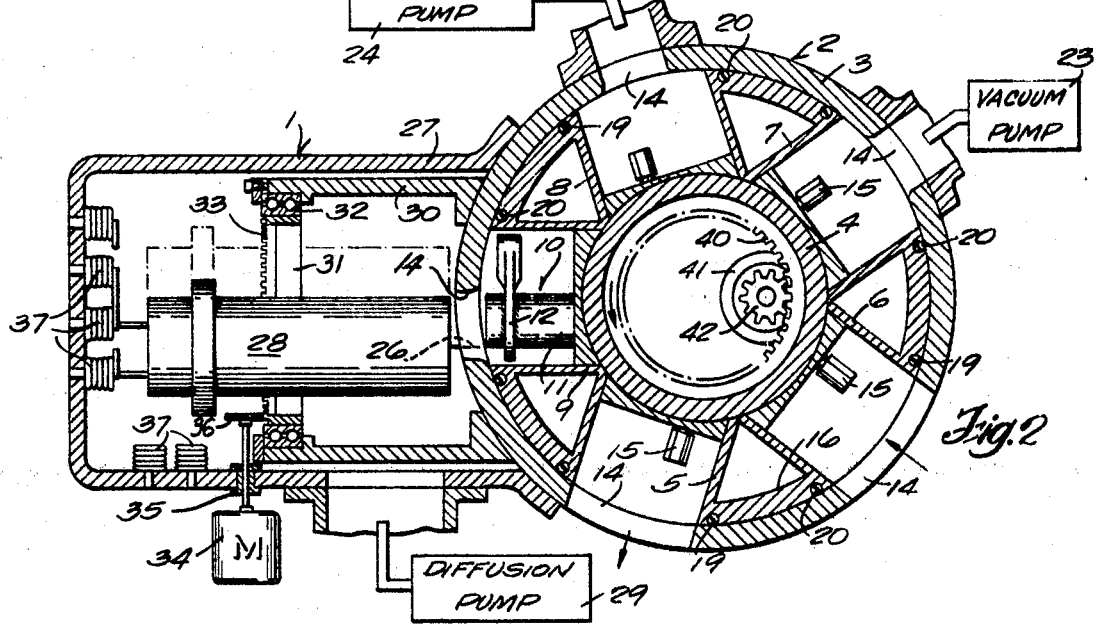
Fig. 2
Fig. 3
Inventor
John F. Hinrichs
By
Andrus, Sceales, Starke & Sawall
Attorneys

AUTOMATED ELECTRON BEAM WELDING

This invention relates to an electron beam welder apparatus and particularly to an automatic apparatus for the sequential movement of work members between a loading position and an unloading position.

Electron beam welding has very substantial advantages from the standpoint of welding ease, the appearance and character of the final weld and the like, when compared to the more conventional arc welding processes which have heretofore been employed in the fabrication of metal parts. The production application of electron beam welding, however, presents particularly unique problems because of the requirement of the proper location of the work with respect to the electron beam and the establishment of a vacuum condition when vacuum welding. The copending application of John F. Hinrichs et al. entitled "Electron Beam Welding Apparatus" which was filed Mar. 18, 1968 with Ser. No. 713,598 now U.S. Pat. No. 3,535,478 discloses a satisfactory multiple station transfer system for electron beam welding. In that system, a rotating table is provided with a loading and unloading station circumferentially spaced from each other with a welding station therebetween. The parts to be welded are inserted into a suitable support on the table at the loading station and the table is then indexed into alignment with the welding station. Relative movement is established between the support and a welding fixture to move the work member into an enclosure defining a vacuum welding chamber.

The present invention is particularly directed to a multiple station transfer device employing a series of sealed chambers secured to a rotating member. As the member rotates, it sequentially aligns the chambers with a loading station, a vacuum pumping station, a welding station and finally an unloading station which may of course be combined with the loading station. It is only at the loading and unloading station that the chamber is exposed or opened and consequently the chamber can be pumped to a desired vacuum before it is aligned with the welding chamber to permit immediate establishment of the weld beam. The present invention may be employed with a single corresponding vacuum for the weld gun and the weld chamber or with a dual vacuum in which the weld gun is maintained at a required high vacuum and the weld chamber at a lesser vacuum.

The present invention thus provides a system wherein each cycle is essentially restricted only by the welding time plus the indexing time as the vacuum pumping as well as the loading and unloading may be completed during the weld cycle. Minimizing the cycle time is significant from the commercial standpoint because of the relative substantial investment in electron beam welding equipment and the like.

In accordance with a preferred construction of the present invention, a cylindrical chamber belt unit or housing is provided with a suitable vertical axis. An inner support is rotatably journaled in any suitable manner within the housing and interconnected to a power means to provide for intermittent stepped rotation of the support. A plurality of equally circumferentially spaced chambers are secured to the support and project outwardly to the outer housing. Sliding seal means are disposed between the outer end walls of the chambers and the outer housing wall to provide a fluid-type seal of the chamber to the housing. The several operating stations are located about the assembly and preferably include in sequence a loading station, a first pumping station, a second pumping station, a welding station and an unloading station. The loading and unloading stations are provided with openings through which components can be moved into and removed from a suitable supporting fixture within the aligned chambers. The first pumping station is provided with a suitable mechanical pump or the like which can reduce the vacuum to partially reduce the chamber to a partial vacuum in the time required to complete a weld at the welding station. The second vacuum pumping station will normally be provided with a diffusion and mechanical pump means or the like which can rapidly further reduce the chamber to a desired welding vacuum within the allotted time. The welding station includes an opening through which an electron beam gun is secured to the outer portion of the housing in alignment with the opening. The gun is operative to establish an electron welding beam for making the desired weld.

In a highly satisfactory application the present invention might be applied to the formation of a circular weld for example, in the interconnection of a platelike blade to the exterior of a cylindrical bushing. In such a structure the chambers would be provided with a suitable locating pin to which the bushing with the blade supported thereon may be mounted. The electron beam welding gun is mounted on a rotatable support which is adapted to rotate the electron beam gun with an eccentric movement such that the welding beam is aligned with the juncture of the bushing and the blade for producing a continuous weld between the bushing and blade.

Alternatively, the gun may be held stationary and the electron beam suitably deflected along a weld line which is straight, curved, square or any other configuration required by the particular application.

The multiple chamber arrangement permits convenient loading and unloading at a given atmosphere, for example, normal atmospheric conditions while permitting the sequential evacuation and welding during the loading and unloading.

The drawing furnished herewith illustrates a preferred construction of the present invention in which the above advantages and features are clearly disclosed as well as others, which will be readily understood from the following description.

In the drawing:

FIG. 1 is a side elevational view of the welding apparatus with parts broken away to clearly illustrate certain detail of the internal construction;

FIG. 2 is a horizontal section through the apparatus shown in FIG. 1; and

FIG. 3 is a developed view of a portion of the structure shown in FIG. 1 and 2 to more clearly illustrate the sliding seal construction and support.

Referring to the drawing and particularly to FIG. 1, the illustrated embodiment of the invention includes an electron beam welding assembly 1 secured to the one side of a cylindrical, multiple chambered transfer assembly 2. The transfer assembly 2 generally includes an outer cylindrical chamber belt or housing 3 which is mounted in fixed relationship to the rest of the assembly. Rotatably mounted within the stationary housing 3 is a hub member 4 from which, in the illustrated embodiment of the invention, five separate chambers 5, 6, 7, 8 and 9 project in equally circumferentially distributed relationship. Each of the chambers 5—9 is adapted to receive a suitable work 10 which is to be welded. In the illustrated embodiment of the invention, the work 10 includes a cylindrical bushing 11 secured within an opening in a plate or blade 12.

The hub member 4 and five chambers 5—9 are adapted to be angularly stepped within the housing 3 to sequentially align them with the five processing stations similarly spaced about the assembly 2 and particularly housing 3. As most clearly shown in FIG. 2, the assembly is secured as a welding station immediately adjacent an unloading station. A loading station is provided immediately adjacent the leading side of the unloading station and a pair of vacuum pumping stations are provided between the loading station and the electron beam welding station for establishing a suitable vacuum within the chamber prior to alignment with the welding assembly at the welding station.

More particularly, in accordance with the illustrated embodiment of the invention, the outer housing 3 is generally a tubular shaped wall suitably mounted to a base support 13. The several stations include generally similar openings 14 establishing communication to the chambers 5—9. The openings formed with rounded inner edge to protect a seal construction. The chambers 5—9 move sequentially in a stepped movement past the openings 14. The loading and unloading stations open to the work area for manual loading and unloading of the work 10.

The chambers include a backwall from which a support pin 15 projects to receive and firmly support the bushing 11 with the plate 12 extending laterally therefrom. In the illustrated embodiment, the bushing 11 includes an internal hex portion on the innermost end and the pin 15 is correspondingly shaped to provide a firm support. The particular work fixture may, of course, be of any desired construction in accordance with the particular work member and weld line.

The transfer apparatus 2 which supports the several chambers includes the inner rotating hub member 4 from which each chamber 5—9 extends in a general radial manner. Each of the chambers is generally a tubular shaped member with the outer ends terminating in an outer ring wall member 16 located in sliding engagement with the well 3 of the outer housing. As most clearly shown in FIGS. 1 and 3, O-ring seal members 17 and 18 are secured within recesses in the wall member 16 and above and below the chambers 5—9. Vertical seal strips 19 and 20 are similarly disposed within suitable recesses in the outer rotating chamber wall member to the opposite sides of each chamber 5—9 and extend vertically into engagement with the O-ring seals. A rectangular seal is thereby provided completely encircling the outer opening 14 to each chamber 4—9.

A secondary O-ring seal 21 is provided between the outer wall and the housing in slightly outwardly spaced relation to the top O-ring seal 17. A similar second O-ring seal 22 is provided spaced slightly downwardly from the bottom chamber O-ring seal 18. The space between the O-ring seals 17 and 21 and 18 and 22 as well as the space between the adjacent vertical seals 19 and 20 for successive chambers may be differentially pumped to a partial vacuum to minimize the vacuum difference or pressure drop across each of the final seal members 17—20 encircling the chambers 5—9 to more readily maintain the desired vacuum in the chambers.

Thus, as each chamber is moved between the successive stations, the seals maintain essentially fluidtight sealing engagement with the adjacent wall of the outer housing.

At the loading and unloading station, chambers 5—9 are exposed to the atmosphere and the sealing is not of any particular significance.

At the first pumping station, the chamber is aligned with the opening which is interconnected to a suitable mechanical vacuum pump 23 selected to establish a partial vacuum in the aligned chamber 7. As the transfer assembly 2 rotates to move chamber 7 from the first pumping station to the second pumping station the initially established vacuum is maintained by the sealing arrangement.

At the second pumping station, a diffusion and mechanical pump unit 24 is provided and connected via the opening 14 to establish a desired welding vacuum in the aligned chamber 8. This vacuum is maintained by the seals 17—20 as the transfer assembly 2 rotates the chamber to the welding station.

At the welding station, the chamber 9 is aligned through the opening 14 to the electron beam welding unit or assembly 1 and in particular the bushing 11 is located to have an electron welding beam 26 applied to the junction of the plate 12 and bushing 10.

In the illustrated embodiment of the invention, the electron beam welding unit 1 includes an outer housing 27 sealed to the outer housing 3 by welding or the like and encloses an electron beam welding gun 28 to define a welding gun chamber.

The outer electron beam gun housing 27 is interconnected to a suitable diffusion and mechanical pump 29 to establish and maintain a welding vacuum within the housing 27. Consequently, when any one of the chambers 5—9 is aligned with the electron beam welding gun 28, the electron beam 26 can be immediately established.

The electron beam welding gun 28 may be of any desired or known construction and consequently the details thereof have not been illustrated or described.

In the illustrated embodiment of the invention the gun 28 is especially mounted within the housing 27 to permit movement of the electron beam 26 about the bushing 11 to provide a continuous welded connection of the bushing 11 to the plate 12. A support or frame 30 is located within the housing 27 and secured to the chamber housing 3. An electron beam welding support plate 31 is rotatably mounted within the outer end of the frame 30 by a suitable roller bearing structure 32. The electron beam welding gun 28 is secured within an opening in the plate 31 generally offset from the center of such plate, and with the electron beam 26 from gun 28 aligned with the outer surface of the bushing 11. The gun 28 may be mounted to establish a beam 26 parallel to the wall of bushing 11 or at a small angle to insure proper engagement of the beam 26 with the junction of bushing 11 and plate 12. Thus, for any given position of the work 10 the electron beam 26 will be aligned with the weld area and by rotation of the support plate 31 the electron beam 26 completely scans the circular weld area between the plate 12 and the bushing 11.

The electron beam gun 28 is automatically rotated in the following manner. A circular rack member 33 is welded or otherwise secured to the face of the support plate 31. An electron beam drive motor 34 is mounted outside of the gun housing 27 with the shaft extending inwardly through a sealed opening 35. A pinion 36 is secured to the inner end of the motor shaft in mesh with the rack 33. Energization of the motor 34 will therefore cause timed rotation of the pinion 36 and, through the connection of the rack 33 and plate 31, the gun 28.

Suitable sliding contact connections 37 are provided in the outer wall of the housing 27 to permit electrical interconnection between the elements such as the filaments, beam source, focus coils and the like of the electron beam welding gun 28 and a suitable power supply, not shown.

The hub 4 and attached chambers 5—9 are indexed with respect to the several operating stations as follows. The hub 4 and attached chambers 5—9 are indexed with respect to the several operating stations as follows. The hub 4 and chambers 5—9 are supported within the housing 3 by suitably upper and lower rollers 38 and 39. An annular rack 40 is secured or formed on the inner periphery of the hub 4. A motor 41 drives a pinion 42 which meshes with rack 40. The motor 41 is energized in a times sequence to establish the desired movement with alternate dwell periods sufficient to complete the several operations at the stations.

In the operation, the bushing 11 with the unwelded plate 12 thereon is mounted within the aligned chamber 6 at the loading station. The apparatus 4 is then stepped to align a loaded chamber with the first pumping station where a partial vacuum is established by operation of vacuum pump 23. During this period, the electron beam welding gun 28 is actuated and establishes a weldment of the blade 12 to the bushing 11 of the unit within the chamber 9. When the weld is completed the transfer assembly 2 is automatically stepped such that a chamber 7, previously partially pumped, is now connected to the final pumping station. During the final pumping, a previously loaded bushing in a leading chamber 9 is similarly provided with a weld. The finally pumped chamber 8 is then aligned with the electron beam welding unit 1 and the necessary weld established after which it automatically moves to the unloading station.

In the structure shown in the drawings, the substantial opening between the weld gun chamber 27 and the aligned chamber 9 would generally require the pumping of the chamber 9 to a hard vacuum essentially corresponding to that established in chamber 27. However, by appropriate construction to minimize the opening between chamber 27 and the aligned chambers 5—9, the dual vacuum welding process may be employed wherein the chambers 5—9 are pumped to a substantially lesser vacuum. This system can be particularly applied where the weld line is relatively short and requires a relative small opening.

Although the illustrated embodiment of the invention employs radially extended chambers, other arrangements may be employed. For example, a pair of vertically stacked members may be provided with a sliding seal at the interface to seal a plurality of axially extended chambers provided in one member and selectively exposed through the other member.

The apparatus of the present invention thus permits continuous and essentially automated production line electron beam welding in a vacuum chamber without the necessity of establishing the welding vacuum after alignment of the work with the electron beam weld gun.

Various modes of carrying out the invention are contemplated as being within the scope of the following claims particularly pointing out and distinctly claiming the subject matter which is regarded as the invention.

I claim:

1. An electron beam welding apparatus, comprising a multiple chambered assembly having an axis of rotation, at least three circumferentially spaced chambers projecting radially of said assembly and each terminating in a chamber opening, work support means within each chamber to support a work member within the chamber, a sealing sidewall encircling said assembly immediately adjacent the chamber openings and extending transversely and circumferentially about the assembly and including sidewall openings defining operating stations circumferentially spaced and aligned in accordance with said spaced chambers and including at least a transfer station, a vacuum pumping station including means to establish a vacuum in an aligned chamber and a welding station, a sliding sealing means about each chamber opening between said sealing sidewall and said chamber, means to establish relative movement between said sealing sidewall and said assembly to sequentially align each chamber with said stations, an electron beam gun chamber secured to the sidewall at the welding station in alignment with an opening in said sidewall, and electron beam gun, mounted within said gun chamber, and means to maintain said electron beam gun chamber at a welding vacuum whereby the welding beam may be established immediately upon the alignment of a chamber with said welding station.

2. The electron beam welding apparatus of claim 1, including means coupled to said gun to move the electron beam with respect to an aligned chamber for forming of elongated welds on said work.

3. The electron beam welding apparatus of claim 1, wherein said multiple chambered assembly includes at least five chambers and said sidewall includes separate loading and unloading stations and having a pair of vacuum pumping stations between the loading station and the welding gun chamber.

4. The electron beam welding apparatus of claim 1, wherein said sealing sidewall is a first outer ring wall, said chambers are secured to a support hub and project radially outwardly therefrom and terminate in a second outer ring wall adjacent the first ring wall, and said sealing means includes seal members disposed between said ring walls to separately encompass the openings of each chamber.

5. The electron beam welding apparatus of claim 1, wherein said sealing wall means is a first outer ring wall, said chambers are secured to a control hub and project radially outwardly therefrom and terminate in a second outer ring wall adjacent the first ring wall, annular sliding seal members disposed between said ring walls above and below said chambers, cross seal members disposed between said ring walls to the opposite sides of each chamber and extending between said annular seal members, and having drive means coupled to said hub to provide stepped movement of the chambers between said stations.

UNITED STATES PATENT OFFICE
CERTIFICATE OF CORRECTION

Patent No. 3,592,995            Dated July 13, 1971

Inventor(s) JOHN F. HINRICHS

It is certified that error appears in the above-identified patent and that said Letters Patent are hereby corrected as shown below:

Column 3, Line 29, (Page 6, Line 11, of the Application)     cancel "second" and substitute ---secondary---;

Column 4, Line 39, (Page 8, Line 28, of the Application)     before "chambers" cancel the word "attached";

Claim 1
Column 6, Line 1, (Claim 1 Line 2, of the Application)     cancel "and" and substitute ---an---;

Claim 1
Column 6, Line 2, (Claim 1 Line 22, of Amendment "A")     cancel the comma (,) appearing after "gun" (first occurrence).

Signed and sealed this 11th day of January 1972.

(SEAL)
Attest:

EDWARD M. FLETCHER, JR.
Attesting Officer

ROBERT GOTTSCHALK
Acting Commissioner of Patents